United States Patent Office 3,327,911
Patented June 27, 1967

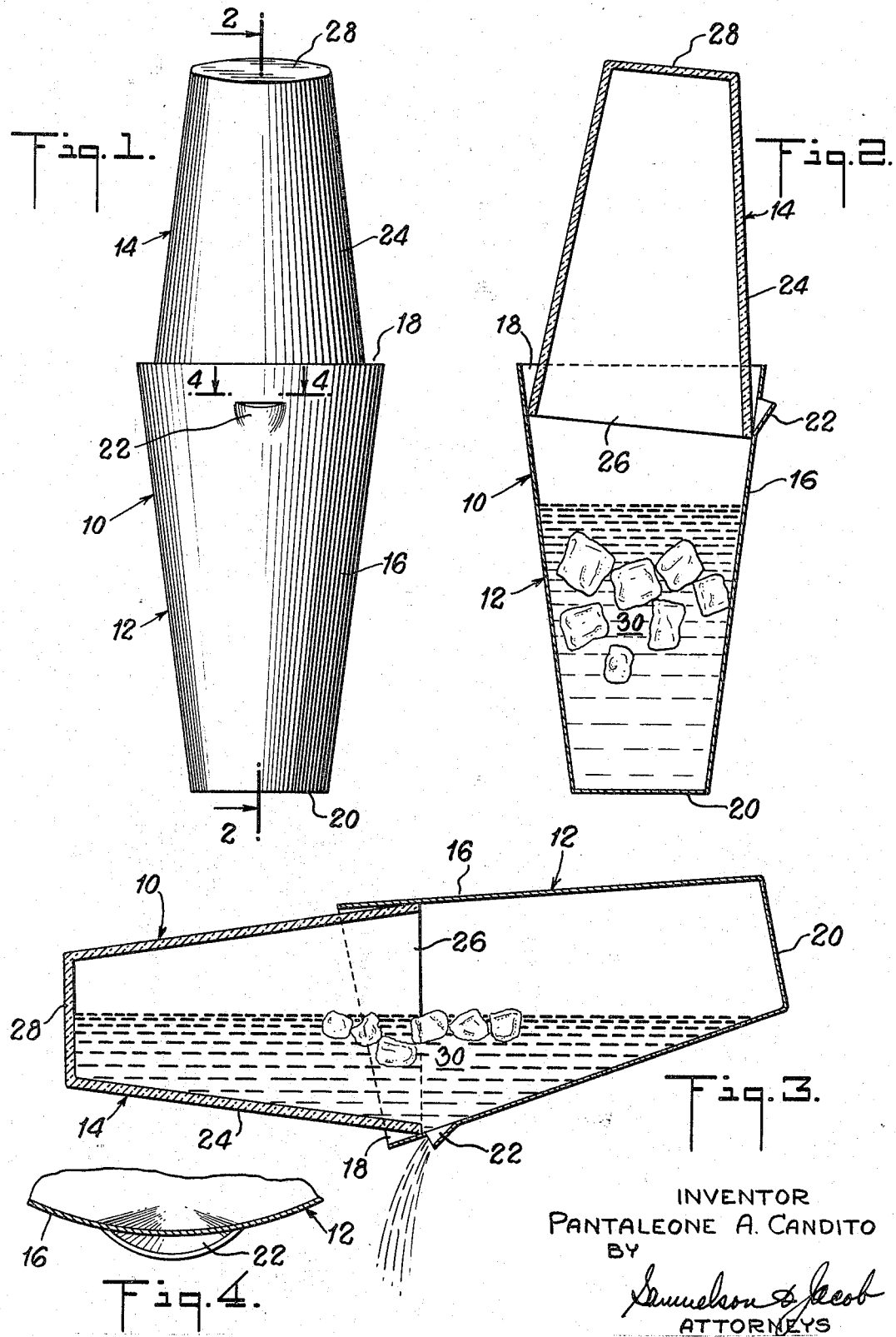

3,327,911
BEVERAGE MIXERS
Pantaleone A. Candito, 3 Jerome Place,
North Brunswick, N.J. 08902
Filed Oct. 20, 1965, Ser. No. 498,262
3 Claims. (Cl. 222—572)

The invention relates to beverage mixers and in particular to those beverage mixers wherein the beverage is mixed with pieces of ice or other solids and is poured from the mixer while the flow of the ice or other solids from the mixer with the liquid portion of the beverage is inhibited.

A variety of beverage mixers are currently available for use in mixing drinks at soda fountains, bars and restaurants as well as in the home. Such mixers are generally employed in the mixing of beverages containing components which require agitation for thorough mixing and are adapted to be shaken in order to provide the requisite agitation. Some materials employed in these beverages, such as pieces of ice, fruit and the like, remain solid after shaking and must be strained from the beverage before the drink is served. While many mixers have such straining features, it would be advantageous to have available a beverage mixer of simplified design and construction which operates in a manner similar to conventional mixers, but which incorporates means providing the advantages of readily accomplished straining of the contents as the contents are poured from the mixer.

It is an important object of the invention to provide a beverage mixer having two open-mouthed containers with complementary configurations, one of which has a spout in its wall adjacent its mouth and spaced therefrom.

Another object of the invention is to provide such a beverage mixer wherein one of the containers has a larger mouth than that of the other and the containers have complementary configurations so that the two containers may be placed mouth to mouth with one inside the other.

It is a further object of the invention to provide such a beverage mixer wherein pivotal movement of the inner container with respect to the outer container between first and second positions serves to seal the contents from the spout and from the outside in the first position and to open a path for the contents through the spout to the outside in the second position.

These and other objects, advantages, features and uses will be apparent during the course of the following description.

Briefly, the invention comprises two containers having mouths of different diameters, the containers having complementary configurations so that the container with the smaller mouth may be fitted inside the container with the larger mouth in a first position to seal the contents of the containers and prevent any of the contents from being spilled during mixing. The container with the larger mouth is also provided with a spout in its wall adjacent its mouth and spaced from the mouth so that the mouth of the inner container seals the contents from the spout as well as from the outside when a beverage is being mixed. The smaller-mouthed container may be pivoted within the larger-mouthed container to a second position so that a path for the contents is open to the spout and to the outside while keeping enough of the balance of the junction between the two containers effectively sealed against leakage of the contents. In this second position the beverage may be poured from the mixer while the egress of ice or other solid material is inhibited. A screen may be built into the wall of the container in conjunction with the spout to restrict the size of the particles which may be poured from the spout.

In the accompanying drawings, forming a part of this application, and in which like numerals are employed to designate like parts throughout the same:

FIGURE 1 is a side elevational view of a beverage mixer constructed in accordance with the invention;

FIGURE 2 is a sectional view taken along the line 2—2 of FIGURE 1, viewed in the direction of the arrows, showing the contents sealed from the spout and from the outside (first position);

FIGURE 3 is a sectional view showing the containers in the second position to permit the user to pour the liquid from the spout; and FIGURE 4 is an enlarged sectional view taken along the line 4—4 of FIGURE 1, viewed in the direction of the arrows.

In the drawing, wherein, for the purpose of illustration, is shown a preferred embodiment of the invention, the numeral 10 designates the beverage mixer of the invention. Beverage mixer 10 is seen to comprise containers 12 and 14. Container 12 has a frusto-conical configuration with a longitudinally extending wall 16 tapering from a relatively large diameter open mouth 18 to a relatively small diameter closed bottom 20. A spout 22 is located in the wall 16 adjacent the mouth 18 and is spaced longitudinally therefrom. Container 14 also has a frusto-conical configuration with a longitudinally extending wall 24 tapering from an open mouth 26 to a relatively smaller closed bottom 28. Liquid and solid contents 30 are placed in either container 12 or 14 and the two containers are placed in cooperation as shown in the figures. In the position shown in FIGURES 1 and 2, mouth 26 of container 14, which is smaller than mouth 18 of container 12, is placed inside mouth 18 so that wall 24 at the rim of the mouth 26 engages the inside of wall 16 between spout 22 and bottom 20 to seal the contents 30 within the mixer 10.

The beverage mixer is agitated while the containers are in this first position until the proper homogeneity is obtained in the contents. Then, without separating the containers, they are pivoted with respect to each other to a second position wherein wall 24 at the rim of the mouth 26 engages the inside of wall 16 between the spout 22 and the mouth 18 so that a path for the contents is opened to the spout 22 and to outside of the mixer while enough of the balance of the junction between walls 16 and 24 of the respective containers remains effectively sealed against leakage of the contents. In this second position, the contents of the mixer may be poured from the spout while the flow of ice or other relatively large particles of solid material through the spout is inhibited due to the relatively small dimensions of the spout. If desired, a screen or grate (not shown) may be placed in wall 16 at the spout 22, or adjacent the lip of the spout, to further restrict the size of the solid particles which may be poured from the beverage mixer through the spout. It will be seen that in pivoting the containers from the first position to the second position the longitudinal axes of the containers are rotated in a lateral plane so that at least a portion of wall 24 at the rim of mouth 26 is moved from a position between the spout 22 and bottom 20 of container 12 to between the spout and mouth 18.

The seal between wall 24 at the rim of mouth 26 and the inside of wall 16 need not be perfectly tight all the way around the perimeter of the mouth when the containers are in the second position described above. It is sufficient that an effective seal be maintained along the perimeter of wall 24 at the rim of mouth 26 where the junction between wall 24 at the rim of mouth 26 and the inside of wall 16 is submerged below the level of the contents 30 when the mixer is in the attitude illustrated in FIGURE 3.

It has been found best to fabricate container 12 of a slightly flexible material to allow the cross-sectional configuration of wall 16 to conform with the configuration of wall 24 at the rim of mouth 26 so as to ensure that an effective seal will be maintained between the two containers when the containers are in either of the two positions employed in the above described operation of the mixer 10. Thus, container 12 is shown formed of relatively thin sheet metal while container 14 is made of a thicker rigid glass. The same sealing effect may also be obtained if either the larger container 12 or the smaller container 14 is made with a wall having a contour where the containers interengage one another, which contour is generated by the revolution of a curve, the curve having a center about which the containers are pivoted, rather than a straight line. It will be apparent that the construction of the containers is very simple and each is economically fabricated. The mixer is easy to use and to maintain.

As various changes could be made in the above construction without departing from the scope of the invention, it is intended that all matter contained in the above description or shown in the accompanying drawings shall be interpreted as illustrative and not in a limiting sense.

What is claimed is:
1. A beverage mixer comprising:
   a first container having a wall tapered outwardly at least at its top extending longitudinally from an open mouth to a closed bottom and capable of retaining liquid contents therein;
   a second container having a wall extending longitudinally from an open mouth similar to but smaller than the first container mouth to a closed bottom and capable of retaining liquid contents therein;
   a spout in the tapered wall of the first container adjacent the mouth thereof and spaced longitudinally therefrom;
   the size of each said container being such that the mouth of the second container passes through the mouth of the first container to place the containers in cooperative engagement for relative movement with respect to one another between a first position wherein the wall of the second container at the mouth thereof engages the inside of the wall of the first container between the spout and the bottom thereof to seal the contents from the spout and a second position wherein the wall of the second container at the mouth thereof engages the inside of the wall of the first container between the spout and the mouth thereof to open a path for the contents through the spout and to the outside of the mixer.

2. A beverage mixer of claim 1 wherein at least the first contour configuration is tapered longitudinally from a relatively larger mouth to a relatively smaller bottom.

3. A beverage mixer of claim 2 wherein the wall of the first container is sufficiently flexible to conform the cross-sectional configuration of that wall to the configuration of the wall of the second container at the mouth thereof where the wall of the second container at the mouth thereof cooperatively engages the inside of the wall of the first container.

References Cited

UNITED STATES PATENTS

| | | | |
|---|---|---|---|
| 2,752,971 | 7/1956 | Tupper | 222—572 X |
| 2,813,651 | 11/1957 | Schlumbohm | 222—572 X |
| 3,134,523 | 5/1964 | Hostetter | 222—572 |

ROBERT B. REEVES, *Primary Examiner.*

HADD S. LANE, *Examiner.*